(12) United States Patent
Riley et al.

(10) Patent No.: US 7,451,735 B2
(45) Date of Patent: Nov. 18, 2008

(54) FLEXIBLY-JOINTED, FLUID-TIGHT COVER FOR INTERNAL COMBUSTION ENGINE

(75) Inventors: William Riley, Livonia, MI (US); Mark Zagata, Livonia, MI (US); Michael Schrader, Canton, MI (US); Chris Wicks, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 11/549,158

(22) Filed: Oct. 13, 2006

(65) Prior Publication Data

US 2008/0087247 A1    Apr. 17, 2008

(51) Int. Cl.
*F02B 77/00* (2006.01)
*F01M 9/10* (2006.01)
(52) U.S. Cl. .................. 123/195 C; 123/90.38
(58) Field of Classification Search ............... 123/903.8, 123/195 C, 198 E, 90.38; 181/204
See application file for complete search history.

(56) References Cited

U.S. PATENT DOCUMENTS

| | | | |
|---|---|---|---|
| 3,692,335 A * | 9/1972 | Vickers et al. .............. 181/200 |
| 4,244,438 A * | 1/1981 | Willmann ................... 181/204 |
| 4,257,369 A * | 3/1981 | Abe et al. ................ 123/198 E |
| 4,498,433 A | 2/1985 | Ogawa |
| 4,719,892 A * | 1/1988 | Lopez-Crevillen ...... 123/198 E |
| 4,958,878 A | 9/1990 | Kempkers |
| 5,492,086 A | 2/1996 | Kuhns |
| 6,085,709 A | 7/2000 | Freese |
| D490,818 S | 6/2004 | Hicke |
| 6,896,098 B2 * | 5/2005 | Vom Stein et al. .......... 181/204 |

FOREIGN PATENT DOCUMENTS

JP    2001182552    7/2001

* cited by examiner

*Primary Examiner*—Noah Kamen
(74) *Attorney, Agent, or Firm*—Dickinson Wright PLLC; Julia Voutyras

(57) ABSTRACT

A flexibly-jointed, fluid-tight cover for enclosing a portion of an internal combustion engine includes generally rigid structural cover panels which are joined by fluid-tight flexible joints formed from elastomeric material which is either inserted into the rigid structural cover panels after the joint has been molded, or molded in place by inserting the cover parts within a mold and injecting material into the mold to form the flexible fluid-tight joints.

15 Claims, 3 Drawing Sheets

FLEXIBLY-JOINTED, FLUID-TIGHT COVER FOR INTERNAL COMBUSTION ENGINE

BACKGROUND OF THE INVENTION

1. Field of the Invention

The present invention relates to a cover for an external portion of an internal combustion engine. The cover has one or more flexible, fluid-tight joints to allow more rigid portions of the cover to be hingedly moved with respect to each other during installation of the cover upon an engine.

2. Disclosure Information

The engine compartments of automotive vehicles have grown increasingly crowded through the years, as more and more componentry is added to vehicles. Although it has always been desirable to maintain leak-free engines, this task has grown more difficult because the use of one-piece covers continues to be inhibited by the requirement that covers be readily removable to permit maintenance operations to be performed upon an engine. Unfortunately, large one-piece covers may not always be used because of the difficulty of installation and removal. On the other hand, multi-piece covers while permitting installation, also provide additional leak paths for fluids such as coolants, and lubricants. It would be desirable to provide a cover which is both fluid-tight and yet locally flexible, so as to promote ready installation upon an engine situated within a crowded engine compartment.

SUMMARY OF THE INVENTION

According to an aspect of the present invention, a flexibly-jointed, fluid-tight cover for enclosing a portion of an internal combustion engine includes a plurality of generally rigid structural cover panels and at least one fluid-tight, flexible joint extending between adjacent ones of the structural cover panels. The cover panels may be fabricated either from metal or from plastics material, it being understood that suitable structural strength is required in the context of an engine cover, which must be resistant to both physical and thermal damage.

A fluid-tight, flexible joint according to one aspect of the present invention is formed as an elastomeric member slidingly inserted between adjacent ones of structural cover panels. The elastomeric member may be dovetailed into the structural cover panels. As an alternative, the fluid-tight, flexible joint included in the present cover assembly may be molded in place between adjacent structural cover panels. A gasket may also be molded about an outer periphery of the structural cover panels. This presents the possibility of making the gasket and fluid-tight, flexible joint unitary.

A cover according to the present invention is useful for such applications as a camshaft cover for a typical dual overhead camshaft engine, in which generally channel-shaped panels are joined with a generally planar panel therebetween having spark plug apertures. A cover according to the present invention may also be used beneficially as a front cover on an engine having a generally channel-shaped lower panel for enclosing an engine adjacent one end of the engine's crankshaft, and a generally planar upper panel for enclosing a portion of the engine adjacent a cylinder head.

According to another aspect of the present invention, a method for fabricating a flexibly-jointed, fluid-tight cover for enclosing an engine includes forming a plurality of generally rigid structural cover panels, and placing the cover panels in adjoining cavities of a mold device. The method concludes with the steps of injecting an elastomeric material into the mold device so as to form a flexible fluid-tight joint between adjoining ones of the generally rigid structural panels, and if desired, injecting additional elastomeric material into the mold device so as to form a gasket extending about an outer periphery of the structural cover panels.

Other advantages, as well as features and objects of the present invention, will become apparent to the reader of this specification.

DETAILED DESCRIPTION OF THE PREFERRED EMBODIMENT

Figure 1:
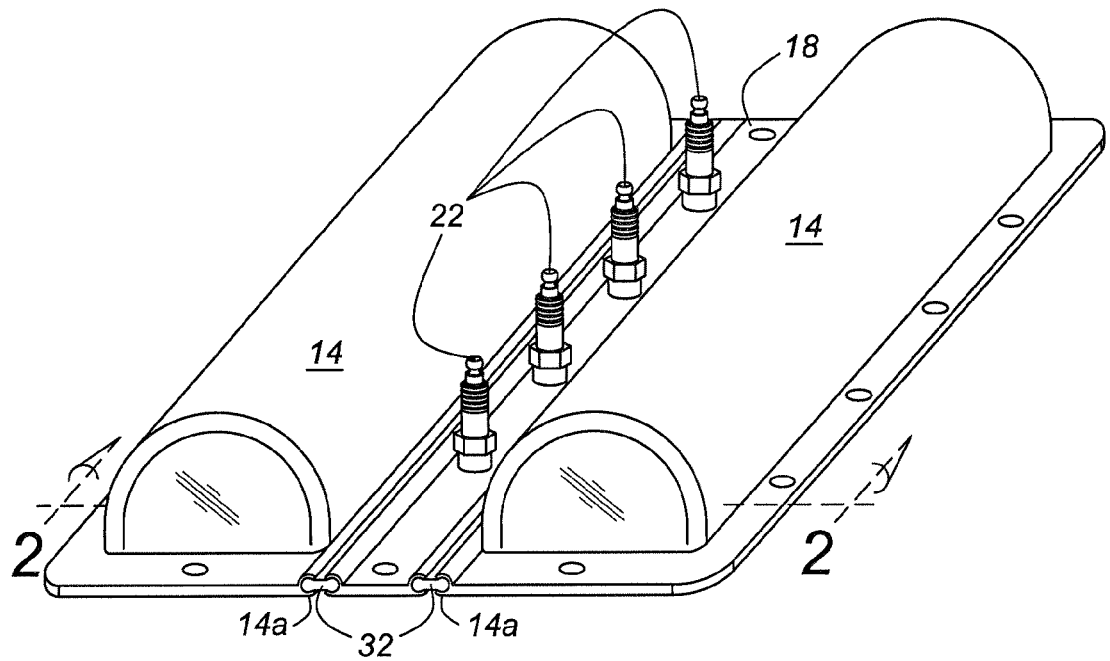
FIG. 1 is a perspective view of a camshaft and cylinder head cover according to an aspect of the present invention.

As shown in FIG. 1, cover assembly 10 has two generally channel-shaped panels 14. Generally channel-shaped panels 14 adjoin a generally planar panel, 18. Panel 18 has a number of spark plug ports or apertures, 24, with spark plugs 22 being mounted therethrough. In use, channels 14 would extend over the top of a camshaft mechanism, sealing the camshaft mechanism from the environment and preventing oil from leaking from the engine.

Figure 2:
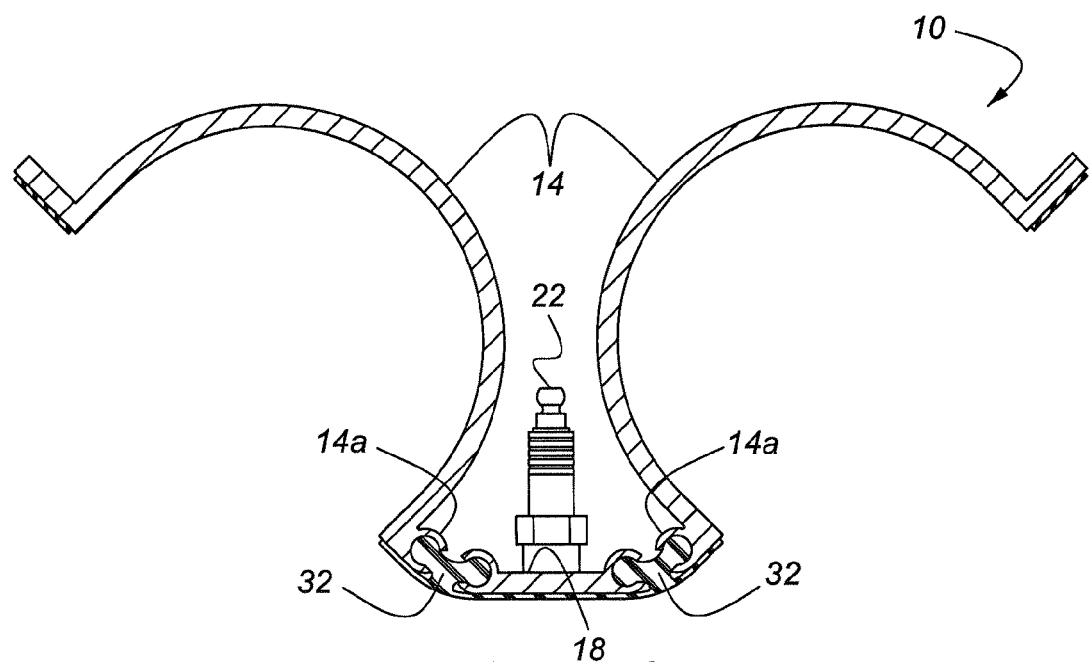
FIG. 2 is an end view of the cover shown in FIG. 1.

FIG. 1 shows cover assembly 10 in its installed position. FIG. 2, however, shows cover 10 in a flexed position for installation. In FIG. 2, generally channel-shaped panels 14 have been rotated upwardly with respect to generally planar panel 18. This upward rotation is permitted by flexible joints 32 which may be either cast in place, as described below, or slidingly inserted into dovetail sockets 14a, which are formed on the inboard sides of generally channel-shaped panels 14.

Figure 3:
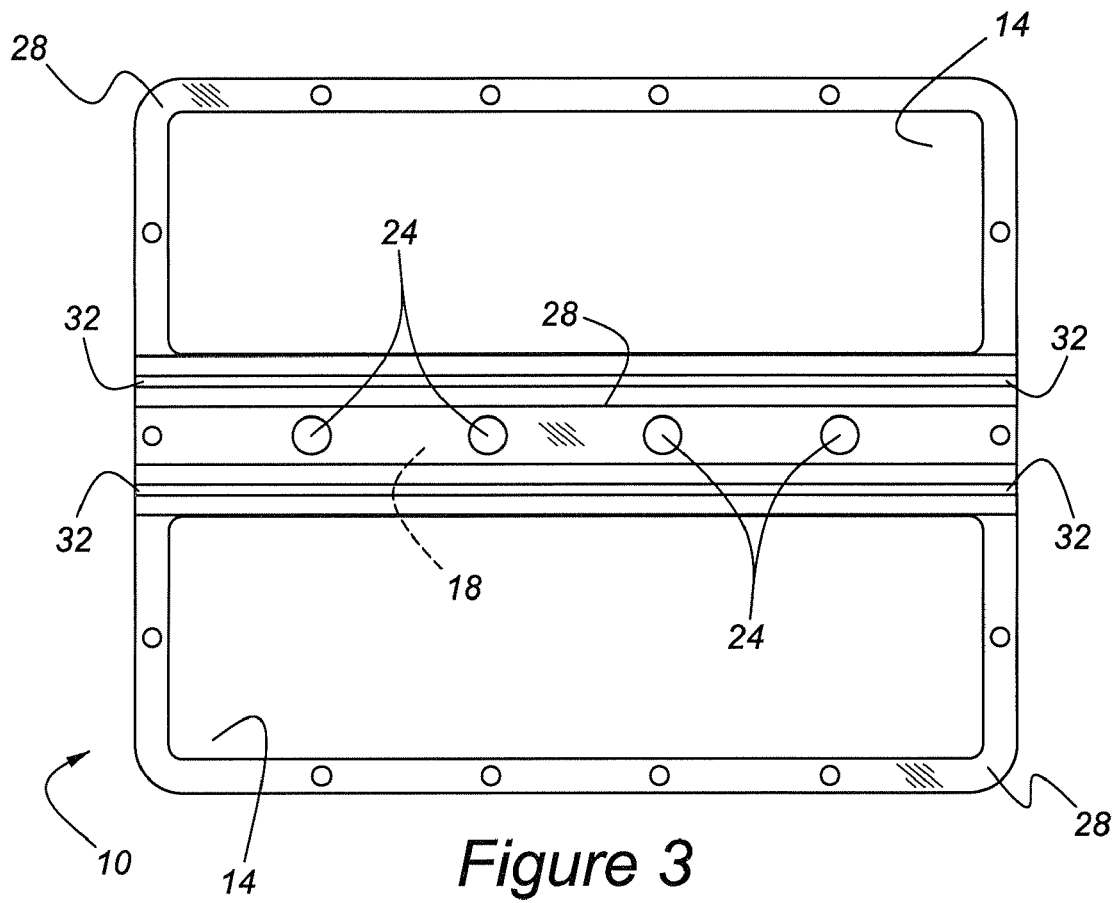
FIG. 3 is a plan view of the underside of the cover shown in FIG. 1.

FIG. 3 shows cover 10 as having a peripheral gasket, 28, which may be formed in place with flexible joints 32. This may be accomplished by means of the molding process illustrated in FIG. 5 and described below.

Figure 4:
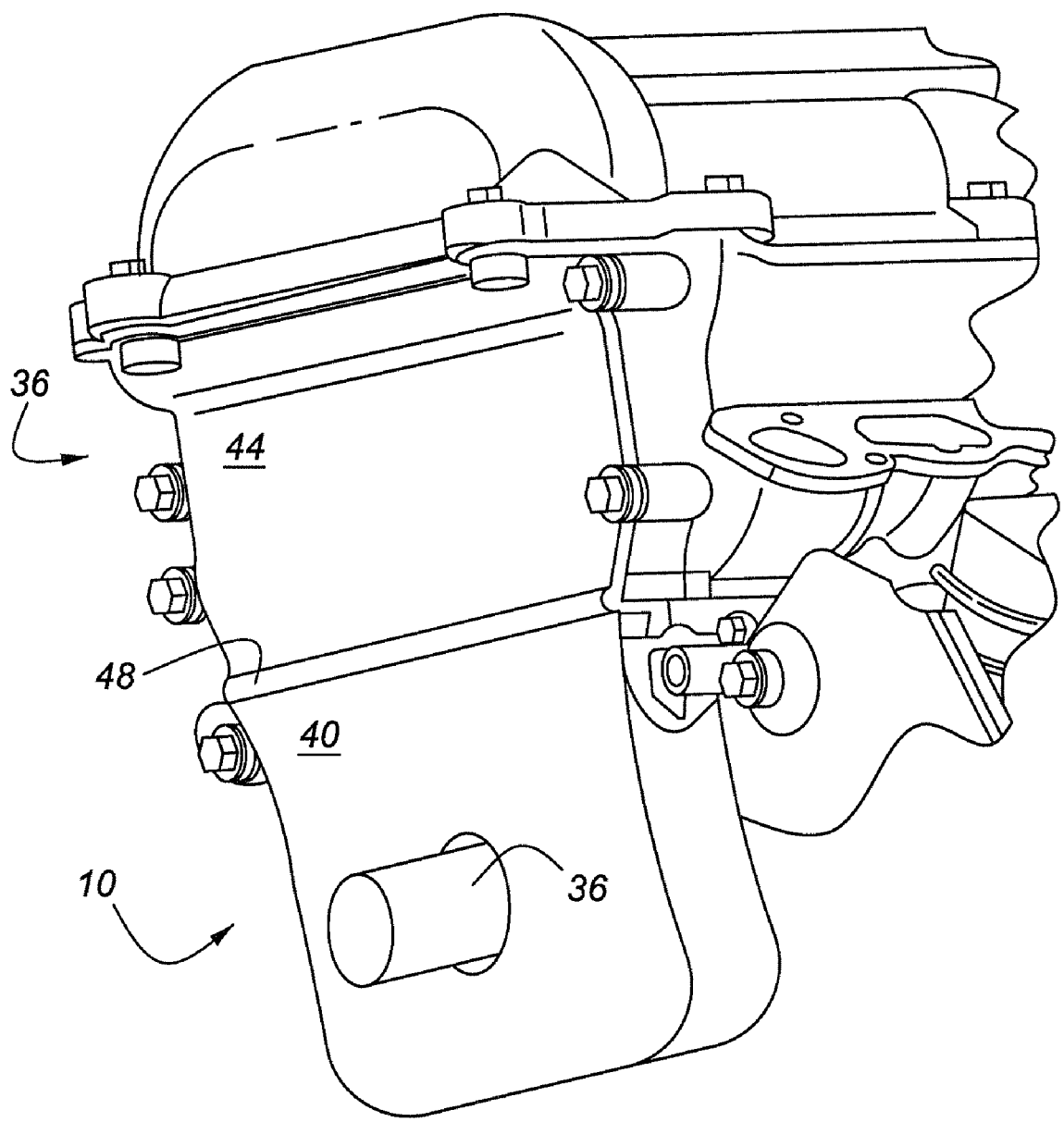
FIG. 4 illustrates an engine front cover according to an aspect of the present invention.

FIG. 4 illustrates an embodiment according to the present invention in which cover assembly 10 has a generally channel-shaped lower panel through which crankshaft 36 of an engine extends. Lower panel 40 is hinged by means of flexible joint 48, which is formed, as described in connection with FIGS. 1-3, to a generally planar upper panel, 44. As with the embodiment of FIGS. 1-3, the embodiment depicted in FIG. 4 may be flexed or hinged so that panels 40 and 44 may be worked into place upon the front of an engine.

Figure 5:
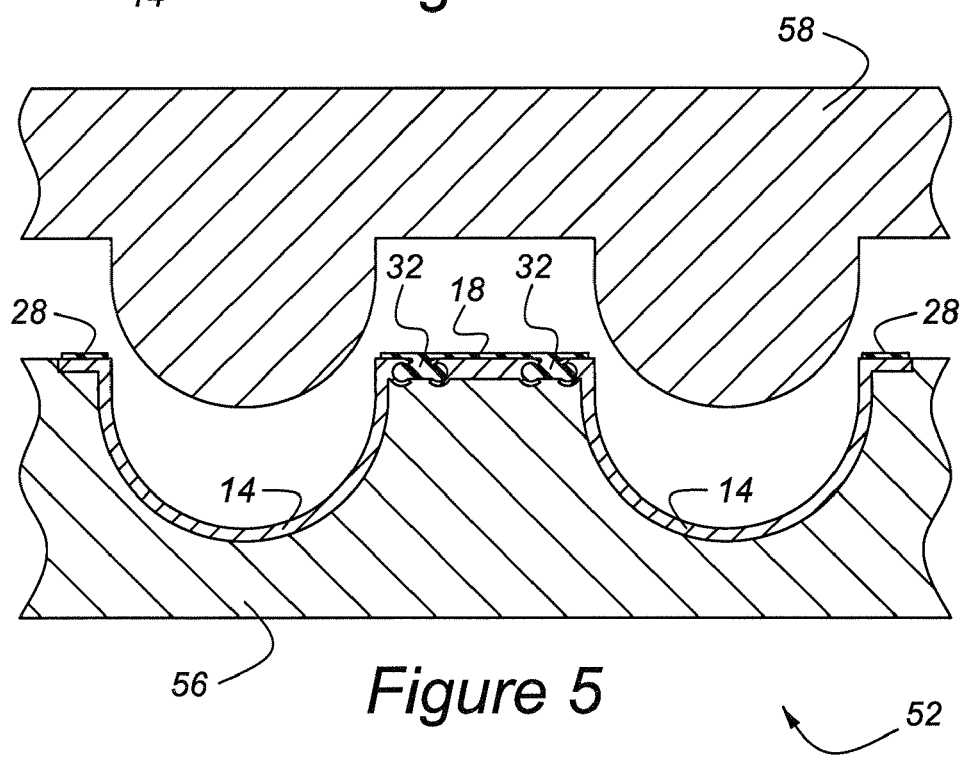
FIG. 5 illustrates a molding method according to an aspect of the present invention.

FIG. 5 illustrates a molding process according to the present invention in which cover assembly parts 14 and 18 are mounted within a mold, 52, having a lower mold 56 and an upper mold 58. Then, elastomeric material may be injected into the mold so as to provide not only flexible joints 32, but also gasket 28. Several types of engineering elastomers are suitable for forming the flexible fluid-tight joints according to the present invention. For example, silicone rubber, nitrile rubber, and ethylene propylene rubber, and neoprene are but a few of the choices available to those skilled in the art and suggested by this disclosure.

While particular embodiments of the invention have been shown and described, numerous variations and alternate embodiments will occur to those skilled in the art. Accordingly, it is intended that the invention be limited only in terms of the appended claims.

What is claimed is:

1. A flexibly-jointed fluid-tight cover for enclosing a portion of an internal combustion engine, comprising:
   a plurality of generally rigid structural cover panels;
   at least one fluid-tight, flexible joint extending between adjacent ones of said structural cover panels; and
   a gasket extending about an outer periphery of said structural cover panels, with said gasket and said fluid-tight flexible joint being unitary.

2. A cover according to claim 1, wherein said rigid structural cover panels are fabricated from metal.

3. A cover according to claim 1, wherein said rigid structural cover panels are fabricated from a plastics material.

4. A cover according to claim 1, wherein said fluid-tight flexible joint comprises an elastomeric member slidingly inserted between said adjacent ones of said structural cover panels.

5. A cover according to claim 4, wherein said elastomeric member is dovetailed to said structural cover panels.

6. A cover according to claim 1, wherein said fluid-tight flexible joint comprises an elastomeric member molded in place to join said adjacent ones of said structural cover panels.

7. A cover according to claim 1, wherein said structural cover panels comprise generally channel-shaped panels for enclosing camshaft portions of a cylinder head.

8. A cover according to claim 1, wherein said structural cover panels comprise generally channel-shaped panels for enclosing camshaft portions of a cylinder head and a generally planar panel for enclosing a central portion of a cylinder head.

9. A cover according to claim 1, wherein said structural cover panels comprise a generally channel-shaped lower panel for enclosing an engine adjacent one end of a crankshaft, and a generally planar upper panel for enclosing a portion of said engine adjacent a cylinder head.

10. A method for fabricating a flexibly jointed, fluid-tight cover for enclosing a portion of an internal combustion engine, comprising:
    forming a plurality of generally rigid structural cover panels;
    placing said plurality of generally rigid structural cover panels in adjoining cavities of a mold device; and
    injecting an elastomeric material into said mold device, so as to form a flexible, fluid-tight joint between adjoining ones of said plurality of generally rigid structural cover panels.

11. A method according to claim 10, further comprising injecting additional elastomeric material into said mold device, so as to form a gasket extending about an outer periphery of said structural cover panels.

12. A fluid-tight cylinder head cover for an internal combustion engine, comprising:
    a generally planar central panel having a plurality of spark plug apertures;
    a plurality of generally channel-shaped panels for enclosing portions of a cylinder head, with said generally channel-shaped panels adjoining said planar central panel; and
    a plurality of elastomeric, fluid-tight, flexible members mechanically incorporated within said cylinder head cover, with one of said flexible members being interposed between said planar central panel and each of said generally channel-shaped panels.

13. A cylinder head cover according to claim 12, wherein said generally planar central panel and said generally channel-shaped panels are fabricated from metal.

14. A cylinder head cover according to claim 12, wherein said generally planar central panel and said generally channel-shaped panels are fabricated from a plastics material.

15. A cylinder head cover according to claim 12, wherein said generally planar central panel and said generally channel-shaped panels are fabricated from a composite material.

* * * * *